Dec. 25, 1951  G. S. LEY ET AL  2,579,591
RELAY SYSTEM

Filed April 19, 1947  3 Sheets-Sheet 1

WITNESSES:
Edward Michaels
F. E. Crowder

INVENTORS
Gordon S. Ley, Coleman J. Miller
& Albert A. Nims, Jr.
BY
Hymen Diamond.
ATTORNEY Dec. 25, 1951

G. S. LEY ET AL 2,579,591

RELAY SYSTEM

Filed April 19, 1947

WITNESSES:
Edward Michaels
F. E. Browder

INVENTORS
Gordon S. Ley, Coleman J. Miller
& Albert A. Nims, Jr.
BY
Hymen Diamond.
ATTORNEY Dec. 25, 1951  G. S. LEY ET AL  2,579,591
RELAY SYSTEM
Filed April 19, 1947  3 Sheets-Sheet 3
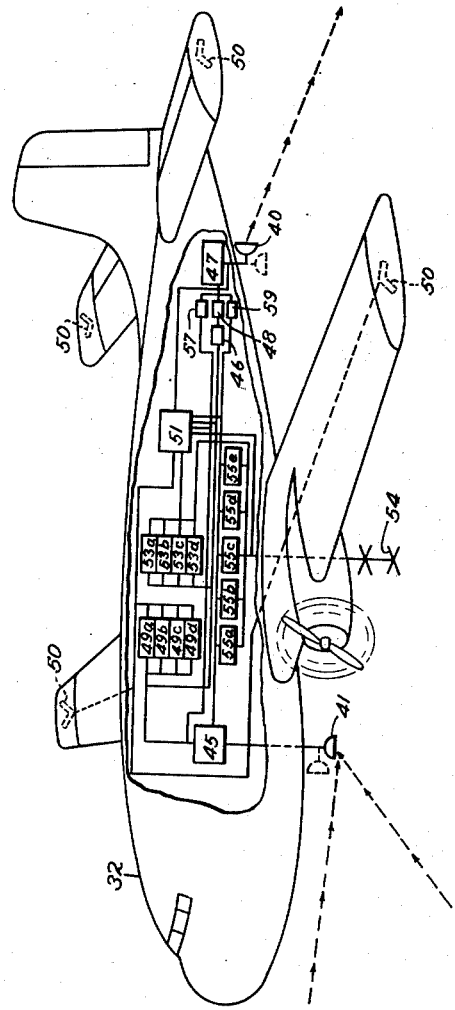
Fig. 4b.
WITNESSES:
Edward Michaels
F. E. Crowder
INVENTORS
Gordon S. Ley, Coleman J. Miller
& Albert A. Nims, Jr.
BY
Hymen Diamond
ATTORNEY
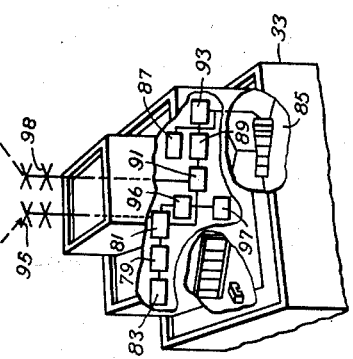

Patented Dec. 25, 1951

2,579,591

UNITED STATES PATENT OFFICE 2,579,591

RELAY SYSTEM

Gordon S. Ley, Groveland, Mass., and Coleman J. Miller and Albert A. Nims, Jr., Catonsville, Md., assignors to Westinghouse Electric Corporation, East Pittsburgh, Pa., a corporation of Pennsylvania Application April 19, 1947, Serial No. 742,654

13 Claims. (Cl. 250—15)

This invention relates to radio systems and it has particular relation to an improved radio system employing equipment mounted on aircraft for retransmitting or relaying programs.

An application Serial No. 609,669, entitled "Radio Systems," inventor, Charles E. Nobles, filed August 8, 1945, assigned to the assignee of this application, discloses a system for transmitting or relaying radio programs from one station in an aircraft flying at a high altitude to another aircraft station. In this type of transmission, the energy from the first aircraft travels to the second aircraft along two paths. One of these paths is what is known in the art as the direct transmission path, which is the path along which radiant energy travels directly from the first aircraft to the second aircraft. The other path is referred to as the ground reflected path, which is the path travelled by radiant energy from the first aircraft which is reflected from the ground before it is received by the second aircraft. In accordance with the physical laws of reflection, the point of reflection from ground lies between the two aircraft and is determined by the law; angle of incidence equals angle of reflection. When the radiation is reflected from ground, its phase is reversed at the point of reflection.

If the difference in length of one of the transmission paths is an odd multiple half wave length of the other path, the energy reaching the receiving aircraft along the two paths will be in aiding phase and will add to provide the resultant signal received by the second aircraft. However, if the difference in length of one of these paths is an even multiple half wave length of the other path, the energy from the two paths will reach the receiving plane in opposing phase and consequently will oppose each other or subtract and the remainder will be the resultant signal. This condition results in fading or dead spots in the program signals received by the second aircraft in the relay system and will also cause "ghost" when receiving television programs.

The difference in length between the direct transmission path and the ground reflected path is substantial. If the frequency of transmission is high, this difference will equal a large number of wave lengths and the change in the number of wave lengths as the aircraft circle or as the frequency transmitted varies over the pass band of the system will be substantial. Therefore, the change in the signal strength will vary at a high rate not only as the aircraft circles but also as the transmitted frequency changes over the pass band of the system.

The automatic volume control of the receiver in the receiving aircraft changes the whole pass band of the receiver as it performs its function. If the volume control were designed to operate at a sufficiently high tune rate to keep up with the changes produced by the circling of the craft, it would to an extent correct the fading in a system with a narrow frequency pass band. In such a system, the frequency throughout the band is substantially constant as far as the fading effect is concerned. Volume control correction over the band, therefore, affects any frequency received within the band in such manner as to correct the fading. The band width over which volume control correction can be effected depends on the height of the aircraft above the earth and other factors. The band width allowed for high frequency programs, such as frequency-modulated programs, black and white television, and color television, is much too wide to permit the use of such a volume control system. Volume control correction which would be satisfactory for one frequency in the band is not satisfactory for another.

It it contemplated by this invention to remedy the objection discussed above by providing a relay system comprising a first airborne aircraft station, an intermediate ground relay station, and a second airborne aircraft station. In the proposed system, the first airborne aircraft will receive a program from a ground station or another airborne aircraft and will retransmit this program at a selected frequency to the intermediate ground relay station. The ground relay station will then retransmit the program received from the first airborne aircraft to the second airborne aircraft. The intermediate ground relay station may retransmit the program to the second airborne aircraft at the same frequency at which it received the program or at a different frequency. In this system the ground relay station is located between the two airborne aircraft relay stations and it receives most of its signal along what would normally be the reflected path. Signal fading and ghost signal may be suppressed in this system if all of the relay stations are operating on the same frequency by relating the transmitted powers so that the signal received by the second aircraft station from the intermediate ground relay station is much stronger than the signal received along the direct or line-of-sight path from the first airborne aircraft station and will consequently dominate the signal received from the first airborne aircraft station. If the intermediate ground station retransmits to the second airborne aircraft station at a different frequency from that at which it receives from the first airborne aircraft station, the receiving equipment on the second airborne aircraft station will be tuned to a different frequency than that at which the first aircraft station transmits and consequently will not respond to signals reaching this station along the direct or line-of-sight path from the first aircraft station, therefore eliminating fading and ghost signals which would normally be caused by signals reaching the second station along two paths and in opposing phase with each other.

Signals transmitted from the ground station and reflected from ground will be received by the airborne station together with the direct signals. However, the difference in path length (ground station to airborne station) between the direct signals and the reflected signals will be relatively small and even for high frequency transmission will be equivalent to only a few wave lengths. The change in the path difference for the extreme frequencies over a wide frequency band will, therefore, be small and the system will lend itself to volume control correction. The change in the path difference as the aircraft circles will also be small and the time rate of operation of the automatic volume control may be small.

To illustrate this feature of our invention, consider the following practical situation in accordance with our invention:

Effective height of aircraft above ground station _____ $H=10,000$ ft.
Horizontal distance between air stations and ground station _____ $D=100$ miles
Effective height of ground station antenna _____ $h=100$ ft.

Let

Direct signalling path=$d$
Reflected signalling path=$d'$ $$d'-d=\frac{4Hh}{d+d'}=\frac{4Hh}{2d}=\frac{2Hh}{d}$$

$$=\frac{2(10000)(100)}{528000}=4'\text{ approximately}$$

For a frequency of transmission of 1000 megacycles, the wave length is approximately 1 foot. Accordingly, in the above situation the difference in path is equal to 4 wave lengths at 1000 megacycles. If the band width of the system is 20 megacycles, the variation in the difference in path over the whole band width is $$\frac{20}{1000}\times 4 = .08 \text{ wave lengths}$$

Such a system lends itself to volume control correction since the difference in path in terms of wave length over the whole band is small. For any volume control setting the signal strength of the received signal for signals, having frequencies differing by the 20 megacycles of the band pass, will differ by a magnitude corresponding to a shift in phase of less than one tenth wave length. Such a difference is too small to affect materially the operation of the system.

Let us assume that the aircraft's path is a circle of ten miles diameter, say from 90 miles to 100 miles from the station. The differences in path lengths when the aircraft is nearest and remotest from the ground station are $$\frac{2(10000)(100)}{5280\times 90}$$

and $$\frac{2(10000)(100)}{(5280)100}$$

respectively.

The difference between these two path differences is 10% and the difference in wave length is approximately 10% of 4 wave lengths or .4 of a wave length. The signal strength variation by reason of the circling of the plane will, therefore, be at a low time rate and the automatic volume control will operate at a low time rate.

Now consider transmission between two airborne stations spaced 100 miles, each operating at an effective height of 10,000 ft. In such a situation $$H=h=10,000 \text{ ft.}$$
$$D=100 \text{ miles}$$
$$d=D,\ d'=2\sqrt{H^2+\frac{D^2}{4}}$$

$$d'-p=\frac{4H^2}{20} \text{ approximately}$$

$$=\frac{2(10000)^2}{(5280)(10)}=\frac{2000}{5.28} \text{ or 400 ft. approximately}$$

The path difference in such a case is approximately 400 wave lengths for 1000 megacycle transmission. Over a 20-megacycle pass band at 1000 megacycles the difference in path varies by $$\frac{400}{50}$$

or 8 wave lengths. For any setting of the automatic volume control the received signal strength and the receiver output would, therefore, fluctuate wildly as the frequency of the received signal varies over the pass band. For effective circling paths of the aircraft which causes the distance between the aircraft to vary by ten miles, a variation in difference between transmission paths of 40 wave lengths would be introduced. The automatic volume control will, therefore, be required to operate at a high rate to correct for the circling.

It is a general object of the invention to provide an improved radio broadcast system.

It is a further general object of the invention to provide an improved radio relay system.

It is a further object to provide an improved relay system comprising airborne stations and ground stations.

It is still a further object to provide an improved relay system comprising a first aircraft station, a second aircraft station, and an intermediate ground relay station.

It is still a further object to provide an improved radio relay system comprising a first aircraft station, a second aircraft station, and an intermediate ground relay station operating at a different frequency than the aircraft stations.

It is still a further object to provide an improved radio relay system which reduces fading.

It is still a further object to provide an improved radio relay system in which fading, due to energy reaching a station in the system along different paths in opposing phase, is suppressed.

It is still a further object to provide an improved relay system which reduces ghost signals.

A more specific object of our invention is to provide an airborne radio relay system having a wide transmission pass band which shall operate without excessive fluctuations in signal strength over the band.

Another specific object of our invention is to provide an airborne radio relay system having a wide transmission band which shall lend itself readily to automatic volume control.

A further specific object of our invention is to provide an airborne radio relay system in which the signal strength variation arising from the combining of the direct and ground reflected signals at an airborne station shall have a low time rate for transmission frequencies in the microwave range.

These and other objects are effected by this invention as will be apparent from the following description and claims taken in accordance with the accompanying drawings, forming a part of this application, in which:

Figs. 4a and 4b represent schematically the system provided by this invention.

Figure 1:
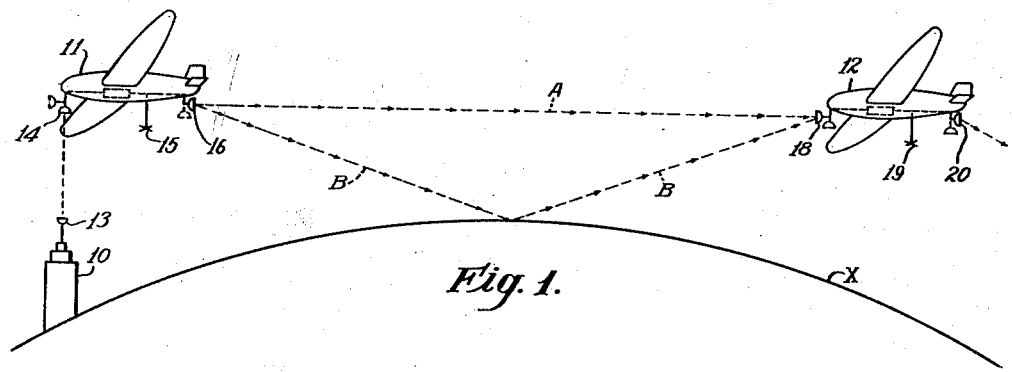
Figure 1 is a schematic representation of a prior art system.
Figure 2:
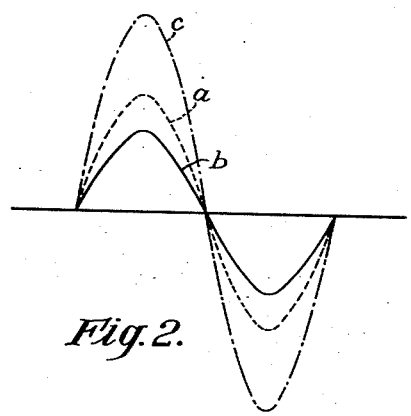
Fig. 2 is a graphical representation illustrating the results when the energy reaching the second station in Fig. 1 along two paths arrive at the second station in aiding phase.
Figure 3:
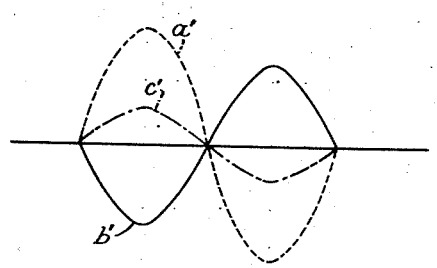
Fig. 3 is a graphical representation illustrating the result when the energy reaching the second station in Fig. 1 along two paths arrives at the second station in opposing phase.

In Fig. 1, we have illustrated a prior art relay system comprising a ground broadcast station 10, a first aircraft relay station 11 and a second aircraft relay station 12. The ground broadcast station 10 may be of any conventional type that is suitable for broadcasting radio or television programs or both and is preferably provided with a directional antenna 13 for directing energy vertically from the station 10. The aircraft may be either of the lighter-than-air type or the heavier-than-air type and may employ any desired system of propulsion, such as propeller, jet or rocket propulsion. The first aircraft station 11 operates in a region substantially over the ground broadcasting station 10. It is equipped with an antenna 14 for receiving programs broadcast by the broadcast station 10 and with an antenna 15 and associated equipment for rebroadcasting to the ground in the vicinity in which the aircraft is flying and another antenna 16 and associated equipment for relaying to the second aircraft station 12 which is cruising at some distance from the aircraft station 11. The second station is equipped with an antenna 18 for receiving energy relayed from the first aircraft station 11 and an antenna 19 for rebroadcasting to the ground over an area below the aircraft and another antenna 20 for relaying the program to another aircraft station in the relay system, if it is so desired. The line X represents the curvature of the earth. The signals from the first aircraft station 11 travel along two paths A and B to reach the second aircraft relay station 12. The path A is what is known in the art as the directly transmitting or line-of-sight path. The path B is what is known in the art as the ground reflected path; signals traveling along path B leave the antenna 16 of the first aircraft station 11 at an angle and strike the ground and are reflected from the ground to the antenna 18 of the second aircraft station 12. As seen in Fig. 1, the path B is longer than the path A. This means that if the path B is an odd multiple number 20 of half wave lengths longer than the path A, the signals reaching the second aircraft station 12 along the two paths will be in aiding phase, as indicated in Fig. 2. The curve $a$ represents the signal transmitted along path A and curve $b$ represents the signal transmitted along path B. In this instance the signals $a$ and $b$ will add to provide a resultant signal at the antenna 18 of the second aircraft station 12 which is represented by the curve $c$. However, if the path B should be an even multiple half wave length longer than the path A, the signal reaching the second aircraft station 12 along the path B will be in opposing phase or 180° out of phase with the signal reaching the second aircraft station along path A. This condition is illustrated by Fig. 3. The curve $b'$ represents the signal transmitted along path B and curve $a'$ represents the signal transmitted along path A and the curve $c$ represents the resultant signal received by the antenna 18 on the second aircraft station 12.

To be able to operate aircraft stations 11 and 12 under the best conditions and get maximum coverage of area below the aircraft stations, it is desirable to operate the aircraft stations in the stratosphere where flying conditions are stable. At altitudes somewhere between 10,000 to 40,000 feet high, the aircraft are spaced approximately 400 miles apart along the curvature of the earth. This system will give a coverage on the curvature of the earth for each of the antennas 15 and 19 of approximately 200 miles' radius with a power of 1 kilowatt. The aircraft stations are adapted to handle programs covering a wide frequency range including frequencies from amplitude modulated frequency range to ultra-high frequencies, such as may be used for television or infrared transmission. It is seen that under these conditions of operation it is practically impossible to maintain a definite relationship in terms of a wave length between the paths A and B. From the calculations presented above it will be seen, for example, that if the aircraft 11 and 12 are flying at an altitude of 30,000 feet (because of the curvature of the earth, the effective altitude for calculation purposes will in this case be of the order of 10,000 feet or less) and are spaced 400 miles apart on the curvature of the earth and are relaying a program which is being transmitted at a frequency of around 2,000 megacycles, a shift in the order of a few megacycles in frequency will change the length of one of the paths A or B enough to cause violent fading of signals or ghost signals. It can also be shown that a shift in altitude of one of the aircraft stations with respect to the other aircraft station will change the relative lengths of the two paths such as to cause fading of signals or ghost signals.

The receivers aboard the aircraft are provided with automatic volume control. However, volume control set to operate properly at one frequency in the pass band will be entirely unsatisfactory at another frequency in the band. Therefore, the volume controls will not effectively correct for the fluctuations.

Figure 4A:
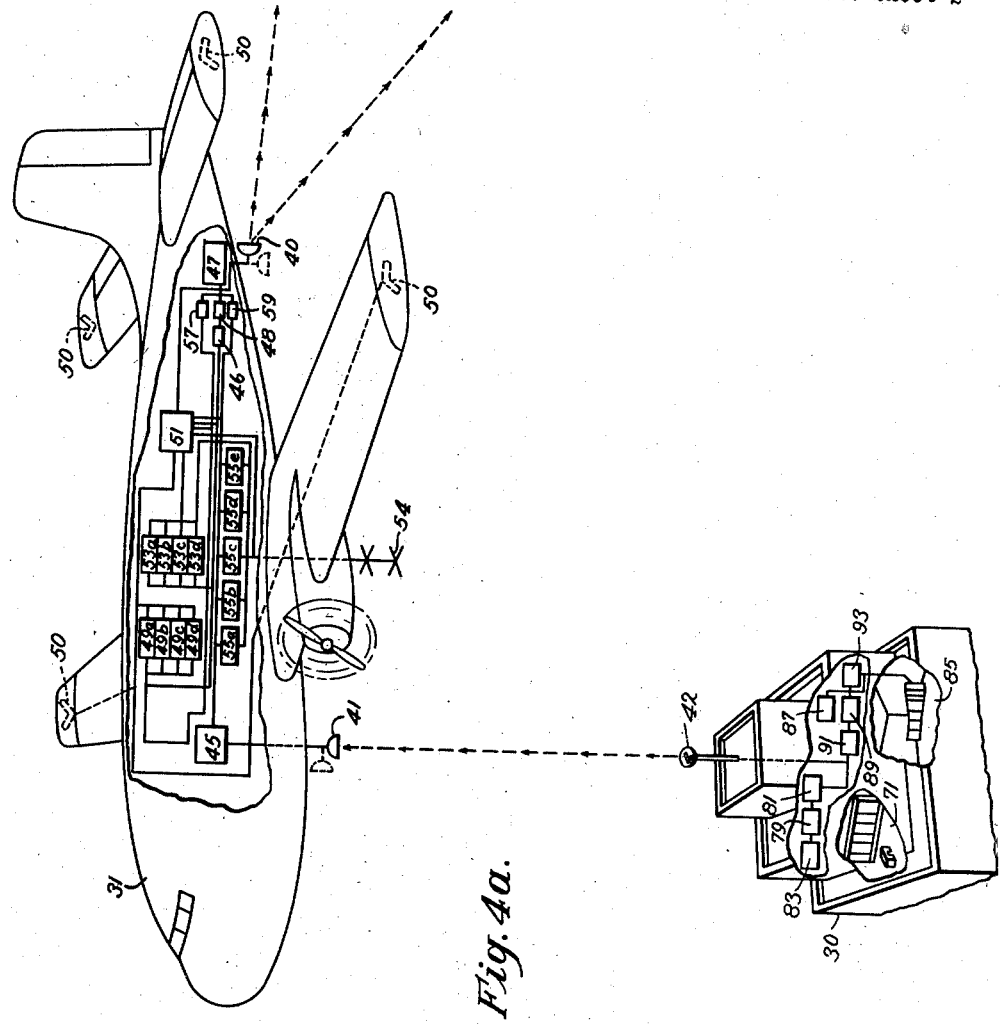

In Figs. 4a and 4b we have illustrated a radio relaying system provided by our invention which suppresses the signal fading, and ghost signals produced with the system illustrated in Fig. 1. Our system includes a ground broadcasting station 30 have an antenna 42 for radiating program signals, a first aircraft station 31 which circles above the broadcast station 30 at the desired altitude, preferably between 10,000 and 30,000 feet, and a second aircraft station 32 which circles at a substantial altitude above a point on the surface of the earth at some distance from the first aircraft station 31, preferably at a distance of approximately 400 miles, and a ground relay station 33 located substantially midway between the first aircraft station 31 and second aircraft station 32. It will be understood that each ground station comprises substantially the same equipment and where like reference numerals appear on different views they represent like parts. It will also be understood that each of the aircraft stations are substantially the same and like reference numerals represent like parts on each view. Consequently, only one ground station and only one aircraft station will be described in detail, however, any differences in the other stations will be pointed out.

Each of the aircraft relay stations comprises an aircraft which is equipped with the necessary receiving and transmitting equipment. It will be observed that each of the aircraft are provided with an antenna 40 for the purpose of transmitting a signal to be relayed to an intermediate ground relay station, such as station 33. In addition, the aircraft are provided with receiving antennas 41 for receiving a signal from a ground broadcasting station, such as station 30, or the preceding intermediate ground relay station 31 in the relay chain. For such reception the antennas occupy a position indicated in solid lines. These antennas may be omnidirectional, but preferably they are directional for the purpose of reducing noise and interference and for the purpose of conserving energy. The angle of the beam projected by the transmitting antenna 42 of the ground station 30 may be sufficiently large (for example 10°) to permit a reasonable amount of maneuvering by the aircraft.

The antennas 40 and 41 may be connected together through suitable equipment. For example, this equipment may comprise a ground link or relay link receiver 45 designed to handle the video and sound signals of television programs and the sound signals of the independent frequency modulated sound programs. The receiver 45 is preferably provided with a suitable automatic volume control for stabilizing its output as the received signal strength varies by reason of atmospheric conditions by reason of the movement of the aircraft or for other reasons. The receiver 45 supplies the video signal on a radio frequency carrier to a video detector and modulator 46. The output of the detector and modulator 46 is coupled to a video relay exciter 48 which supplies a video modulated carrier signal to a relay link transmitter or amplifier 47 for transmission from the relay link antenna 40. The antennas 40 and 41 may be operated at the same or different carrier frequencies. The ground link or relay link receiver 45 also provides video modulated carrier signals for four television programs derived from the antenna 41 to four television video transmitter channels 49a, 49b, 49c and 49d. Each of these channels amplifies one of the signals at a suitable carrier frequency and the amplified signal is then transmitted to the earth over one or more television transmitting antennas 50 which are mounted in the tips of the wing and tail pieces.

If carriers of very high frequency are employed so that each program occupies a band width which is a very small percentage of the carrier frequency, all programs may be received and transmitted over a common receiving antenna and common transmitting antenna. Also, a single channel, such as the channel 49a, may then suffice to handle all programs. When four separate channels are shown each may be connected to a separate television antenna 50 or to a combination of the antennas as desired.

The ground link or relay link receiver 45 may also supply at audio frequencies the sound signal which is to accompany the video programs to four television sound transmitters 53a, 53b, 53c and 53d. Each of these channels modulates a suitable carrier by one of the audio sound signals and amplifies the modulated carrier for transmission to the earth from antennas 54. Here again, if the carrier frequencies are sufficiently high, it is practicable to handle all of the sound programs by means of only one of the transmitter channels, such as the channel 53a.

For frequency modulation sound programs the ground link or relay link receiver 45 may receive five such programs over the antenna 41 and supply such programs at audio frequencies to five frequency-modulation channels 55a, 55b, 55c, 55d and 55e. Each of the channels may be employed for modulating a suitable carrier and amplifying the resulting signal for transmission to the antenna 54. If suitable high carrier frequencies are employed, it is practicable to employ a single channel, such as the channel 55a, for all five sound programs.

The ground link or relay link receiver 45 additionally supplies at audio frequencies the sound programs which accompany the video programs to a suitable sound relay unit 57 which, in conjunction with the transmitter 47, produces a modulated and amplified high-frequency carrier signal for transmission from the antenna 40. Similarly, a frequency-modulation unit 59, in conjunction with the transmitter 47, is supplied with audio frequency-modulation program signals from the receiver 45 to produce a modulated and amplified high frequency carrier signal for transmission from the antenna 40.

It will be understood that the receiver 45 includes amplifiers, detectors, modulators, and any other equipment required to provide the outputs herein referred to.

It will be understood further that the radio components required are well known in the art and a more detailed description of suitable transmitting and receiving equipment is believed to be unnecessary.

All of the receivers, transmitters, channels on the aircraft radio stations may be connected to a suitable monitor and master control unit 51. This unit may be employed for controlling the station equipment in a manner well understood in the art.

Each aircraft station in the relay system may comprise a standard aircraft and the radio equipment described above.

The ground radio station 30 may be of any suitable design capable of directing the desired radiation toward the antenna 41 of the aircraft 31. As shown in Fig. 4a, the station includes a frequency-modulation sound studio 71 having a frequency-modulation transmitter located therein. As shown by the block diagram, the frequency-modulation equipment includes a frequency-modulation, ground link modulator and exciter 79 which is followed by the ground link transmitter or amplifier 81. The modulated carrier output of the ground link transmitter is supplied to the antenna 42 for radiation to the aircraft 31. The various units of the frequency-modulation equipment are connected to a frequency-modulation monitor unit 83 for the purpose of facilitating control of operation of a frequency-modulation studio.

In addition, the station includes a television studio 85. As shown in the block diagram, the television studio equipment includes suitable synchronizing and blanking generators 87 for the television equipment, a modulation unit 89 and a television ground link exciter 91. The output of the exciter may be amplified in the transmitter or amplifier 81 prior to radiation from the antenna 42. The various units of the television studio equipment are connected to a television monitor unit 93 for facilitating control of the equipment. The modulated carrier output of the television studio equipment is supplied to the antenna 42 for radiation to the aircraft 31.

From the foregoing discussion it will be understood that the ground station 30 transmits to the aircraft 31 desired sound and television programs. These programs may be retransmitted, or broadcast, from the aircraft to suitable receivers on the surface of the earth. In addition, the aircraft 31 may be employed for relaying the various programs to other ground relay stations, such as station 33, in Fig. 4b.

It is to be understood that any one of the aircraft in a relay chain may receive a program from a ground station which is to be relayed to another ground relay station.

From the foregoing discussion it will be apparent that each aircraft relay station in the radio relay chain may be employed for receiving a program originating on the ground, for retransmitting the program to the surface of the earth adjacent the aircraft, for relaying the program to a ground relay station located at some distance from the aircraft, and for broadcasting programs relayed from the preceding ground relay station in the chain.

The ground relay station 33 comprises an antenna 95 and associated receiving equipment 96 for receiving programs from the aircraft station 31 and, in addition, frequency-modulation and television transmitting equipment similar to the frequency-modulation and television transmitting equipment comprising the ground station 30. The receiving equipment 96 is provided with an automatic volume control for stabilizing its output as the received signal strength varies. The programs relayed from the aircraft 31 to the ground relay station 33 may be retransmitted by the ground relay station 33 at the same frequency at which they are received or at different frequencies. It is understood that if the programs are relayed at different frequencies, the necessary frequency changing equipment indicated at 97 will be provided. In addition to retransmitting to a second aircraft 32, the ground relay station 33 may also transmit to the area around the station 33. When operating in this manner an omnidirectional antenna 98 would be used instead of a directional antenna, or it might be desirable to use a directional antenna for retransmitting to the aircraft station 32 and an omnidirectional antenna for transmitting to the surrounding area.

The system having been described in detail, the operation thereof will now be set forth. Let it be assumed that a program originates at the ground station 30. This program will be transmitted from the ground station 30 by radio at a substantial frequency, such as 2000 megacycles per second, to the aircraft radio station 31 flying above the ground station 30 at a height of the order of 30,000 feet.

If desired, the aircraft radio station 31 may retransmit, or broadcast, the program to an area under the plane and also relay the program to the ground station 33. The program may be relayed to the ground station 33 at the same frequency at which it is received or at a different frequency. The ground station 33 then retransmits the program to the aircraft station 32. The ground relay station 33 may retransmit the program at the same frequency at which it is received or at a different frequency. Since the ground relay station 33 is located between the two aircraft relay stations 31 and 33, the program signals reaching the aircraft station 32 from the ground relay station 33 along the path B will be much stronger than the program signals reaching the aircraft station 32 along the path A for the proper relationship between the transmitter power outputs at stations 31 and 33. This will substantially reduce signal fading and ghost due to program signals reaching the aircraft station 32 in opposing phase. However, if the ground relay station 33 retransmits at a different frequency than it receives, the receiving equipment on the aircraft relay station 32 will be tuned to the frequency to which the ground relay station 33 transmits and will discriminate against any signals received directly from the first aircraft relay station 31. In this instance, the aircraft relay station 32 will actually receive program signals from ground relay station 33 only and fading of signals and ghost signal due to phase differences will be greatly reduced.

As the aircraft 31 and 32 circle, the signal strength of the signals received at the receivers 96 and 45 varies slowly by reason of the variation in the difference between the direct transmission path and the ground reflected path. The variation is corrected by the automatic volume control in spite of the fact that the pass band of the system is wide (20 megacycles or greater). In terms of wave length, the path difference is so small that the phase difference arising from the path difference at the two extremes of the pass band is negligible at any setting of the volume control. The variation of the signal strength arising from the movement of the aircraft is, moreover, so slow that in certain situations manual volume control will prove satisfactory.

It is understood that the relay chain may comprise any number of aircraft relay stations and any number of ground relay stations. The ground relay stations will be located intermediate the aircraft relay stations and spaced within line-of-sight range of each of the aircraft relay stations and will receive signals along a line-of-sight path from the aircraft relay station to the ground.

Our system, as explained above, provides substantially greater coverage per station than can be obtained with a relay system wherein all of the relay stations are located on the ground or a few hundred feet above the ground.

From the foregoing description it is seen that we have provided an improved radio relay system comprising alternate aircraft relay stations and ground relay stations which reduces signal fading and ghost signals due to program signals reaching the aircraft relay stations along two paths and in opposing phase.

While we have shown our invention in only one form, it will be obvious to those skilled in the art that it is not so limited but is susceptible of various other changes and modifications without departing from the spirit thereof, and we desire, therefore, that only such limitations shall be placed thereupon as are specifically set forth in the appended claims.

We claim as our invention:

1. In a radio broadcasting system, a first aircraft controlled to maintain a substantially fixed relationship to a reference on the earth's surface for a substantial time interval, a radio broadcast transmitter mounted on said first aircraft; a second aircraft, a ground radio relay station located within line-of-sight range of each of said aircraft and comprising receiving and transmitting equipment for receiving high quality signals transmitted from said first aircraft and retransmitting said high quality signals, and a radio receiver disposed on said second aircraft for receiving said retransmitted signals.

2. In a system for broadcasting radio programs, a first aircraft which continuously maintains a substantially fixed relationship to a preselected position on the earth's surface, a second aircraft which continuously maintains a substantially fixed relationship to a second preselected position on the earth's surface, radio broadcast transmitting and receiving equipment disposed on each of said aircraft, a ground relay station located intermediate said two aircraft within line-of-sight range of each of the same and comprising receiving and transmitting equipment for receiving high quality radio signals from one of said aircraft and relaying said signals to said second aircraft in such manner as to reduce phase distortion caused by ground reflections of signals transmitted between said first and said second aircraft.

3. In a radio broadcasting system, a first aircraft, a broadcast transmitter disposed on said first aircraft, said first aircraft continuously maneuvering above a first relatively fixed position on the earth's surface while said transmitter is operated to broadcast radio signals toward said surface, a second aircraft, broadcast receiving and transmitting equipment disposed on said second aircraft, said second aircraft continuously maneuvering above a second relatively fixed position on the earth's surface, a ground relay station located intermediate said first and said second aircraft, said ground relay station comprising receiving equipment for receiving signals transmitted from said first aircraft and transmitting equipment for retransmitting said signals to be received by said second aircraft.

4. In a radio broadcasting system, a first aircraft controlled to continuously remain substantially above a first preselected position on the earth's surface, a broadcast transmitter disposed on said first aircraft and operated to broadcast radio program signals toward the ground, a second aircraft controlled to continuously remain substantially above a second preselected position on the earth's surface and located at a substantially fixed distance from said first aircraft, broadcast receiving and transmitting equipment disposed on said second aircraft and operated when said second aircraft is in its controlled position, a ground relay station intermediate said first and second aircraft, said ground station comprising broadcast receiving equipment for receiving said radio program signals transmitted by said first aircraft and broadcast transmitting equipment for retransmitting said received signals at a frequency different from the frequency at which they were transmitted from said first aircraft, said receiving equipment on said second aircraft being adapted to receive said signals retransmitted by said ground station.

5. In a radio broadcast relay system, a ground station comprising a broadcast transmitter, a first aircraft controlled to continuously maintain a substantially constant relationship to a reference on the earth's surface, broadcast receiving equipment disposed on said first aircraft for receiving radio broadcast signals transmitted from said ground station, a broadcast transmitter disposed on said first aircraft for retransmitting broadcast signals received from said ground station, and operated when said first aircraft is in its controlled position, a ground relay station comprising broadcast receiving equipment for receiving signals retransmitted from said first aircraft and broadcast transmitting equipment for retransmitting said signals, a second aircraft, and broadcast receiving equipment disposed on said second aircraft for receiving signals transmitted from said ground relay station.

6. In a radio relay system for broadcasting programs for reception by the public, a ground station comprising a broadcast transmitter, a first aircraft controlled to continuously maintain a substantially constant relationship to a preselected reference on the earth's surface, broadcast receiving equipment disposed on said first aircraft for receiving signals transmitted from said ground station, broadcast transmitting equipment disposed on said first aircraft for retransmitting signals received from said ground station at a frequency different from the frequency at which they are received, a ground relay station comprising receiving equipment for receiving signals transmitted from said first aircraft and broadcast transmitting equipment for retransmitting said signals at a different frequency from that at which they are received, a second aircraft, receiving equipment disposed on said second aircraft for receiving signals transmitted from said ground relay station, broadcast transmitting equipment disposed on said second aircraft for retransmitting said received signals at a different frequency than the frequency to which they were received.

7. In a system for broadcasting radio programs for reception by the public, a first aircraft disposed a substantial distance above the surface of the earth and controlled to continuously remain in a position substantially fixed respecting a reference on said surface, a second aircraft displaced from said first aircraft a substantially constant relative distance and disposed a substantial distance above the surface of the earth, a ground relay station intermediate said first and second aircraft, a broadcast transmitter disposed on said first aircraft for transmitting program signals to the public in an area below said aircraft and to said ground relay station, receiving equipment disposed at said ground relay station for receiving signals transmitted from said first aircraft, broadcast transmitting equipment at said ground station for retransmitting said signals, receiving equipment disposed on said second aircraft for receiving said signals retransmitted from said ground relay station, and broadcast transmitting equipment disposed on said second aircraft for retransmitting said signals received from said ground relay station to the public in an area beneath said aircraft.

8. In a radio broadcasting system, a first aircraft controlled to continuously remain at a substantially constant distance from a first reference on the surface of the earth, radio broadcast transmitting equipment carried by said first aircraft for transmitting high quality radio program signals, a second aircraft controlled to continuously remain at a substantially constant distance from a second reference on the surface of the earth, radio broadcast receiving equipment carried by said second aircraft for receiving radio program signals, and a ground radio relay station intermediate said first and second aircraft comprising radio broadcast transmitting and radio broadcast receiving equipment for relaying said radio program signals between said first and second aircraft in such manner as to reduce signal fading at said second aircraft.

9. In a system for broadcasting television programs, a first aircraft controlled to continuously remain at a substantially constant distance above a first reference on the surface of the earth, transmitting equipment carried by said first aircraft, a second aircraft controlled to continuously remain at a substantially constant distance above a second reference on the surface of the earth and displaced from said first reference, receiving equipment carried by said second aircraft, and an intermediate relay station located on the surface of the earth including receiving and transmitting equipment for relaying program signals transmitted from said first aircraft to said relay station to said second aircraft in such manner as to substantially reduce ghost signals at said second aircraft.

10. In a system for broadcasting television programs, a first aircraft flying in the stratosphere and controlled to continuously circle about a first position substantially fixed respecting a first reference on the surface of the earth, television broadcast equipment disposed on said first aircraft for transmitting television program signals at high frequencies, a ground relay station disposed within line-of-sight range of said first aircraft, said ground relay station comprising receiving equipment for receiving television program signals transmitted from said first aircraft and transmitting equipment for retransmitting said signals, a second aircraft displaced at a substantially constant distance from said first aircraft and flying in the stratosphere, said second aircraft being disposed within line-of-sight range of said ground relay station, and receiving equipment disposed on said second aircraft for receiving television program signals retransmitted by said ground relay station.

11. In a system for broadcasting television program signals, a first aircraft controlled to continuously remain in a position substantially constant respecting a first reference on the surface of the earth, a second aircraft displaced from said first aircraft at a substantially fixed distance, a ground television relay station disposed intermediate said first and second aircraft, a first television broadcast transmitter and directional antenna disposed on said first aircraft for transmitting television program signals to said ground station, and operated only when said first aircraft is in its controlled position, a receiver located at said ground relay station for receiving signals transmitted from said first aircraft, a second television transmitter and directional antenna located at said ground station for retransmitting said program signals to said second aircraft, television receiving equipment disposed on said second aircraft for receiving said signals transmitted from said ground station, and television transmitting equipment disposed on said second aircraft for retransmitting said signals.

12. In a television relay system, a ground station comprising a television broadcast transmitter, a first aircraft controlled to continuously remain in a position substantially fixed respecting a first reference on the surface of the earth, receiving equipment disposed on said first aircraft for receiving high quality signals transmitted from said ground station, television broadcast transmitting equipment disposed on said first aircraft for retransmitting the high quality signals received from said ground station at a frequency different from the frequency at which they are received, a ground relay station comprising receiving equipment for receiving signals transmitted from said first aircraft and transmitting equipment for retransmitting said high quality signals at a different frequency from that a which they are received, a second aircraft controlled to continuously remain in a position substantially fixed respecting a second reference on the surface of the earth, receiving equipment disposed on said second aircraft for receiving signals transmitted from said ground relay station, television broadcast transmitting equipment disposed on said second aircraft for retransmitting said received high quality signals at a different frequency than the frequency at which they were received.

13. In a television relay system, a first aircraft which is controlled to continuously remain in a substantially fixed relationship with respect to a reference on the earth, a second aircraft which is controlled to continuously remain in a substantially fixed relationship with respect to a second reference on the earth, said first and second aircraft being displaced from each other and the surface of the earth respectively by a substantial distance, a first ground relay station intermediate said first and second aircraft, a transmitter carried by said first aircraft for transmitting high quality television program signals to an area below said first aircraft and to said first ground relay station, receiving equipment for receiving said high quality signals and transmitting equipment for retransmitting said signals at said first ground relay station, a receiver carried by said second aircraft for receiving said retransmitted signals, a transmitter carried by said second aircraft for a second retransmission of said signal, a third aircraft controlled to continuously remain in a substantially fixed relationship with respect to a third reference on the earth, a second ground relay station intermediate said second and third aircraft, a receiver and transmitter located at said second ground relay station for respectively receiving and retransmitting said signal to relay said signal between said second and third aircraft.

GORDON S. LEY.
COLEMAN J. MILLER.
ALBERT A. NIMS, Jr.

REFERENCES CITED

The following references are of record in the file of this patent:

UNITED STATES PATENTS

| Number | Name | Date |
|---|---|---|
| 1,624,966 | Morris | Apr. 19, 1927 |
| 1,894,019 | Buckley | Jan. 10, 1933 |
| 2,127,572 | Peterson | Aug. 23, 1938 |
| 2,155,821 | Goldsmith | Apr. 25, 1939 |
| 2,165,690 | Wademan | July 11, 1939 |
| 2,198,113 | Holmes | Apr. 23, 1940 |
| 2,248,215 | Budenbom | July 8, 1941 |
| 2,421,017 | Deloraine et al. | May 27, 1947 |

FOREIGN PATENTS

| Number | Country | Date |
|---|---|---|
| 358,972 | Great Britain | Oct. 16, 1931 |

OTHER REFERENCES

"Stratovision," Radio Craft, October 1945, pages 17 and 45.